(12) United States Patent
Ban et al.

(10) Patent No.: US 9,997,790 B2
(45) Date of Patent: Jun. 12, 2018

(54) FUEL CELL

(71) Applicant: Hyundai Motor Company, Seoul (KR)

(72) Inventors: Hyeon Seok Ban, Gyeonggi-Do (KR); Yong Gyu Noh, Gyeonggi-Do (KR); Hyun Joon Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 376 days.

(21) Appl. No.: 14/551,019

(22) Filed: Nov. 23, 2014

(65) Prior Publication Data

US 2015/0333341 A1 Nov. 19, 2015

(30) Foreign Application Priority Data

May 16, 2014 (KR) .................... 10-2014-0059148

(51) Int. Cl.

| | |
|---|---|
| *H01M 8/02* | (2016.01) |
| *H01M 8/0258* | (2016.01) |
| *H01M 8/0265* | (2016.01) |
| *H01M 8/0273* | (2016.01) |
| *H01M 8/2483* | (2016.01) |

(52) U.S. Cl.
CPC ....... *H01M 8/0258* (2013.01); *H01M 8/0265* (2013.01); *H01M 8/0273* (2013.01); *H01M 8/2483* (2016.02)

(58) Field of Classification Search
CPC ............ H01M 8/2483; H01M 8/0273; H01M 8/0258; H01M 8/0276; H01M 8/0256; H01M 8/026; H01M 8/0265; H01M 8/0267

See application file for complete search history.

(56) References Cited

U.S. PATENT DOCUMENTS

| | | | | |
|---|---|---|---|---|
| 2004/0110057 A1* | 6/2004 | Yoshimoto | ......... | H01M 8/0258 429/437 |
| 2007/0111082 A1* | 5/2007 | Morishita | ........... | H01M 8/0258 429/447 |
| 2009/0047565 A1* | 2/2009 | Terasaki | ................ | H01M 8/026 429/415 |
| 2012/0244455 A1* | 9/2012 | Wilson | ............. | H01M 8/04089 429/513 |

(Continued)

FOREIGN PATENT DOCUMENTS

| | | | | |
|---|---|---|---|---|
| JP | 2001-143734 | | 5/2001 | |
| JP | 2004-171887 A | | 6/2004 | |
| JP | 2004-220828 | * | 8/2004 | ............. H01M 8/02 |

(Continued)

OTHER PUBLICATIONS

Machine English Translation of JP 2004-220828 to Karakane et al.*
Machine English translation of JP 2008-311099 to Sugaware et al.*

*Primary Examiner* — Michael L Dignan
(74) *Attorney, Agent, or Firm* — Mintz Levin Cohn Ferris Glovsky and Popeo, P.C.; Peter F. Corless (57) ABSTRACT

A fuel cell is provided which comprises a plurality of manifolds at a first end and a second end of the fuel cell and a separator having passages between the first and the second ends of the fuel cell. In particular, the fuel cell includes a nozzle disposed between at least one of the plurality of manifolds and the passages and having an inlet into which a material is introduced from the at least one of the plurality of manifolds and an outlet from which the introduced material is discharged to the passages.

12 Claims, 6 Drawing Sheets

(56) References Cited

U.S. PATENT DOCUMENTS

2014/0234747 A1\* 8/2014 Terada ................ H01M 8/242
 429/458
2015/0079489 A1\* 3/2015 Noh ................ H01M 8/04074
 429/434

FOREIGN PATENT DOCUMENTS

| JP | 2006-344400 A | 12/2006 |
| --- | --- | --- |
| JP | 2007-220371 A | 8/2007 |
| JP | 2008-311099 A | 12/2008 |
| KR | 10-2003-0021075 | 3/2003 |
| KR | 10-2009-0094904 | 9/2009 |
| KR | 10-2011-0092468 | 8/2011 |

\* cited by examiner

FUEL CELL

CROSS-REFERENCE(S) TO RELATED APPLICATION

The present application claims priority of Korean Patent Application Number 10-2014-0059148 filed on May 16, 2014, the entire contents of which application are incorporated herein for all purposes by this reference.

TECHNICAL FIELD

The present invention relates to a fuel cell. In the fuel cell of the present invention, a reaction material may recirculate in an interior of the fuel cell.

BACKGROUND

A fuel cell includes a Membrane-Electrode-Assembly (MEA) provided with a catalyst layer for a reaction of hydrogen and oxygen, and separators provided at both sides of the MEA where water is discharged while hydrogen and air are supplied into an interior of the MEA. In the fuel cell, a plurality of manifolds through which hydrogen and air may flow is provided, such that hydrogen or air may be supplied to a plurality of fuel cells when the fuel cells are stacked. In addition, passages are provided for supplying hydrogen or air to react with the MEA while the hydrogen or air flows are provided between the both ends of the separator.

In general, the hydrogen introduced through the manifold disposed at a first end of the separator may be discharged to an exterior through a manifold disposed at a second end of the separator after passing through the passages. Since the introduced hydrogen reacts and the hydrogen discharged to the exterior is still a reactant, a hydrogen circulator is configured to reintroduce the discharged hydrogen into the manifold disposed at the first end of the separator.

In the related art, a hydrogen circulating apparatus configured to supply and recirculate hydrogen is disposed within a fuel cell stack of a vehicle, which includes: a fuel cell stack having an hydrogen inlet and a hydrogen outlet, a hydrogen circulator connected to the hydrogen outlet of the fuel cell stack, a water trap disposed between the hydrogen inlet of the fuel cell stack and the hydrogen circulator, and a hydrogen supply source connected to the hydrogen inlet of the fuel cell stack. In particular, the hydrogen supply source 16 is connected to the hydrogen outlet 14 of the fuel cell stack 10 and the hydrogen circulator 18 is directly connected to the hydrogen inlet 12 of the fuel cell stack 10 by removing the water trap 20.

However, such an apparatus for recirculating hydrogen installed to the exterior of the fuel cell deteriorates the advantageous configuration of a package. Further, condensate may be additionally generated by an external heat loss, which deteriorates stack humidifying operation. In addition, a pressure loss may be generated in pipes. Moreover, since a substantial mixture gas of hydrogen, nitrogen, and vapor is supplied to an inlet of the stack, properties of the gas may change when the gas flows in a stacking direction thereby generating deviation between the cells. In particular, cost for a loop of the external circulation structure which is driven by an ejector, a hydrogen compressor, and the like is high.

In addition, reducing the sizes of the plurality of manifolds to stably supply reactants has been limited, and increasing the sizes of the passages has been limited as well, and thus an energy output density of the fuel cell may have not been improved.

The description provided above as a related art of the present invention is just for helping in understanding the background of the present invention and should not be construed as being included in the related art known by those skilled in the art.

SUMMARY

The present invention provides a fuel cell which may reduce costs by providing a hydrogen recirculating unit in an interior of the cell instead of providing the hydrogen recirculating unit extraneous to the cell. In addition, the fuel cell may include passages in increased size by providing an ejector in the interior of the fuel cell as the size of a manifold for supplying hydrogen may be remarkably reduced.

In one aspect, a fuel cell may include: a plurality of manifolds at a first end and a second end (e.g., opposite ends) of the fuel cell and a separator having passages between the first end and the second end of the fuel cell. In particular, the fuel cell may also include a nozzle disposed between at least one of the plurality of manifolds and the passages. The nozzle may have an inlet into which a material may be introduced from the at least one of the plurality of manifolds and an outlet from which the introduced material may be discharged to the passages. The nozzle may be disposed between the passages and a hydrogen supply manifold configured to supply hydrogen to the passages.

The passages may include a pair of end passages formed in a widthwise direction of the separator at a first end and a second end of the passages, and may further include a plurality of flow passages formed in a lengthwise direction of the separator between the pair of end passages, such that the pair of end passages may communicate with each other and provided along a widthwise direction of the separator. The plurality of flow passages may further include a main flow passage provided with the nozzle at a first side and a first end of the separator and located in correspondence to the outlet of the nozzle, such that the material discharged from the outlet may be introduced through the main flow passage, and the width of the main flow passage may increase gradually from a portion adjacent to the nozzle to a portion distal from the nozzle. The nozzle may be disposed at a first side of the passages, and a first end passages adjacent to the nozzle may communicate with the outlet of the nozzle.

The fuel cell may further include a gasket disposed along a circumference of at least one of the plurality of manifolds to be attached to the separator. An end of the gasket adjacent to the passages may be separated to form the outlet of the nozzle. In addition, the nozzle may be integrally formed with the gasket and the outlet may protrude toward the passages. Alternatively, the nozzle may be formed by inserting a micro tube into the gasket.

In addition, the separator may further include a connection passage the connects at least one of the plurality of manifolds and the passages, and a portion of the nozzle may be inserted into the connection passage. The separator may further include: a connection passage that connects at least one of the plurality of manifolds and the passages, and the nozzle may be inserted into the connection passage. An insertion recess may be formed at a side of the connection passage, and the nozzle may have a coupling boss inserted into the insertion recess.

The fuel cell may further include a gasket provided along a circumference of at least one of the plurality of manifolds to be attached to the separator, and the gasket may cover a portion of the nozzle. The plurality of manifolds may include: a hydrogen supply manifold configured to supply hydrogen to the passages and a drain manifold configured to discharge the material existing in the passages to the exterior. In particular, the hydrogen supply manifold and the drain manifold may be disposed at the same end of the separator. Alternatively, the plurality of manifolds may include a hydrogen supply manifold configured to supply hydrogen to the passages and a drain manifold configured to discharge the material existing in the passages to the exterior. In particular, the drain manifold may include a pressure sensor configured to measure a pressure of the discharged hydrogen. In the fuel cell of the present invention, a cross-section area of the outlet may be less than a cross-section area of the inlet.

The description provided above as a related art of the present invention is just for helping in understanding the background of the present invention and should not be construed as being included in the related art known by those skilled in the art.

BRIEF DESCRIPTION OF THE DRAWINGS

The above and other features of the present invention will now be described in detail with reference to exemplary embodiments thereof illustrating the accompanying drawings which are given herein below by way of illustration only, and thus are not limitative of the present invention, and wherein.

It should be understood that the appended drawings are not necessarily to scale, presenting a somewhat simplified representation of various exemplary features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, fuel cells according to various exemplary embodiments of the present invention will be described with reference to the accompanying drawings.

Figure 1:
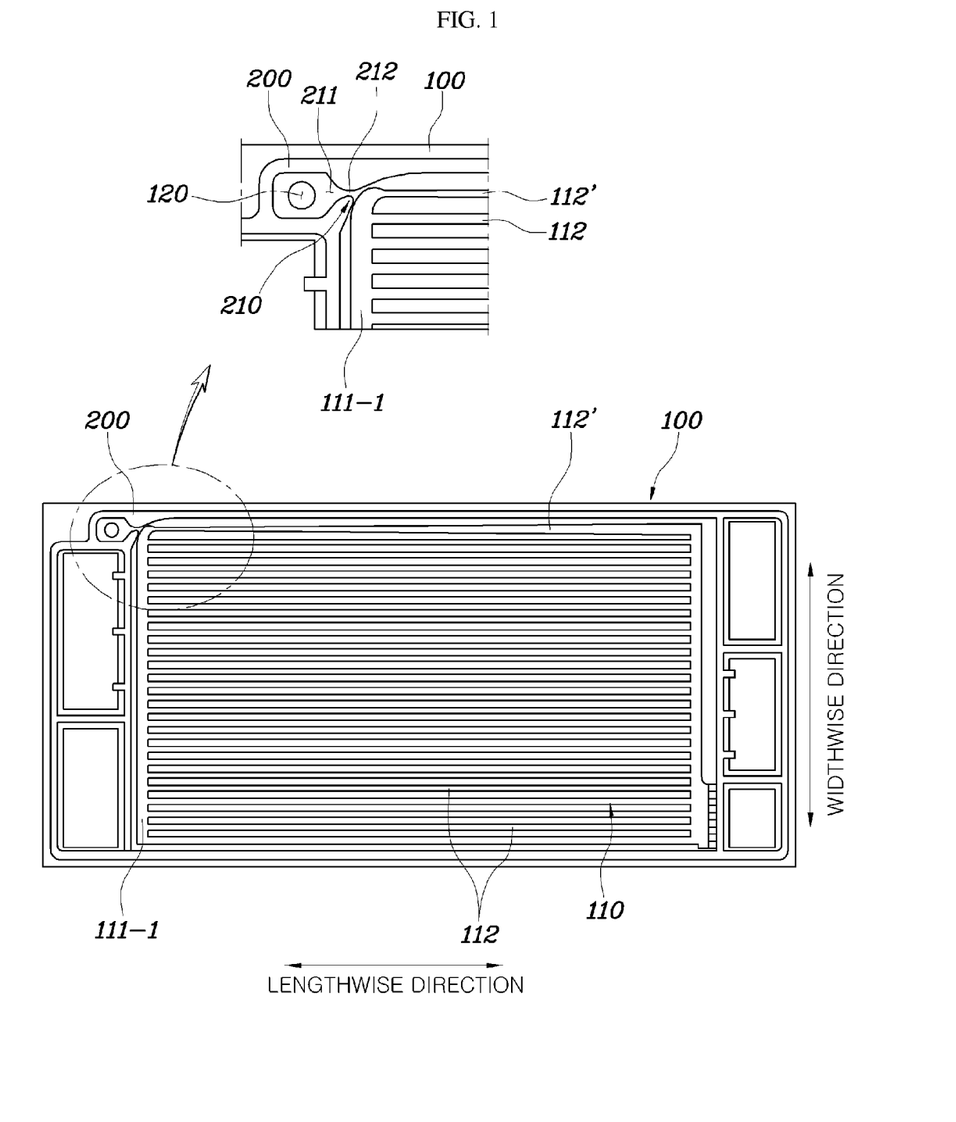
FIG. 1 shows an exemplary fuel cell according to an exemplary embodiment of the present invention.

FIG. 1 shows an exemplary fuel cell according to an exemplary embodiment of the present invention. The fuel cell may include a plurality of manifolds at a first end and a second end of the fuel cell and including a separator 100 having passages 110 between the opposite ends of the fuel cell. The fuel cell may further include: a nozzle 210 disposed between at least one of the plurality of manifolds and the passages. The nozzle may include: an inlet 211 into which a material may be introduced from the at least one of the plurality of manifolds; and an outlet 212 from which the introduced material may be discharged to the passages. In particular, a cross-section area of the outlet 212 may be less than a cross-section area of the inlet 211.

An inflow speed of the material introduced into the passages 110 may be elevated to be greater than a speed at which the material flows along the manifold due to the nozzle 210, and thus reduced pressure may be applied at a side of the passages 110 adjacent to the outlet 212 of the nozzle 210. On the other hand, elevated pressure may be formed at a side of the passages 110 distant from the outlet 212 of the nozzle 210 to reintroduce the material in the passages 110 due to pressure difference generated along the passages.

In addition, a flow rate of the material discharged from the outlet 212 of the nozzle 210 may increase, thereby circulating the material in the passages 110. As the size of at least one of the plurality of manifolds which supplies the material to the inlet 211 is reduced to increase the pressure of the material introduced into the inlet 211 of the nozzle 210, the size of the passages 110 may increase to improve energy output density or increase the sizes of the remaining manifolds, such that the material may be more stably supplied or discharged.

In an exemplary embodiment, the nozzle 210 may be disposed between the passages 110 and a hydrogen supply manifold configured to supply hydrogen to the passages 110. Accordingly, hydrogen may be introduced to the passages to supply the hydrogen to a Membrane-Electrode-Assembly (MEA) constituting the fuel cell together with the separator 100 while flowing along the passages 110. The substance supplied to MEA may not be limited to hydrogen, and the manifold located adjacent to the nozzle 210 may not be limited to the hydrogen supply manifold. For example, when air is introduced into the separator 100, the manifold may be used as an air supply manifold. In an exemplary embodiment, the nozzle 210 may also be disposed between the hydrogen supply manifold 120 and the passages 110.

The passages 110 may include a pair of end passages 111-1 and 111-2 formed in a widthwise direction of the separator 100 at a first and a second lengthwise ends of the passages 110. In particular, the passages may further include a plurality of flow passages 112 formed in a lengthwise direction of the separator 100 between the pair of end passages 111-1 and 111-2 to communicate the pair of end passages 111-1 and 111-2 and provided along a widthwise direction of the separator 100.

Due to the pair of end passages 111-1 and 111-2 and the plurality of flow passages 112 the hydrogen discharged from the nozzle may circulate in the interior of the separator. In other words, the nozzle 210 may be disposed at a first side of the separator 100 and the outlet 212 of the nozzle 210 may be disposed on a first end passage 111-1 of the pair of end passages 111-1 and 111-2 disposed at the first side of the separator 100, such that the hydrogen discharged from the outlet 212 may flow to a second end passage 111-2 of the pair of end passages 111-1 and 111-2 disposed at a second end of the separator 100 along the flow passages 112. A low pressure may be formed in the first end passage 111-1 adjacent to the outlet 212 due to rapid flow of the hydrogen or the like in the ejector, whereas a substantially high pressure may be formed in the second end passage 111-2 due to introduction of the hydrogen, such that the hydrogen introduced into the second end passage 111-2 may flow to the first end passage 111-1 along the plurality of flow passages due to the flow formed by the pressure difference. In addition, the hydrogen introduced into the first end passage 111-1 may be merged into the hydrogen discharged from the outlet 212 to flow to the second end passage 111-2, thereby recirculating the hydrogen.

Since hydrogen may be recirculated in the passages 110 of the separator 100 without installing a separate passage for recirculating hydrogen exterior of the fuel cell stack, a press unit for recirculation of hydrogen may be omitted, a frictional loss due to the flow of hydrogen in the passages during recirculation of hydrogen may be reduced, and performance deviations between cells due to changes in properties of the hydrogen gas when the hydrogen recirculates between the cells can be prevented. In addition, as the size of the hydrogen supply manifold is reduced to supply hydrogen of a high pressure to the nozzle 210, the size of the passages 110 may increase and the reaction area of the separator 100 may increase, as such energy output densities of cells may also be improved.

Meanwhile, the plurality of flow passages 112 may further include a main flow passage 112' disposed in correspondence to the outlet 212 of the nozzle 210. The material discharged from the outlet 212 may be introduced through the main flow passage 112', and the width of the main flow passage 112' may increase gradually as it goes far away from the nozzle 210. Accordingly, the hydrogen rapidly may flow to the second end passage 111-2 as the hydrogen discharged from the outlet 212 is directly introduced into the main flow passage 112' and the kinetic energy of the hydrogen flowing to the second end passage 111-2 may be converted into the potential energy of a pressure as the width of the main flow passage 112' increases gradually such that the cross-section of the main flow passage 112' increase gradually. Accordingly, the pressure of the second end passage 111-2 may remain greater than the pressure of the first end passage 111-1.

In addition, a single main flow passage 112' or two or more main flow passages 112' may be disposed adjacent to each other. Meanwhile, in an exemplary embodiment, the nozzle 210 may further include a gasket 200 disposed along a circumference of at least one of the plurality of manifolds to be attached to the separator 100. In particular, an end of the gasket 200 close to the passages 110 may be separated to form the outlet 212 of the nozzle 210.

In other words, the nozzle 210 may be formed by the separated ends of the gasket 200, and the separation of the separated ends of the gasket 200 may decrease gradually while moving toward the passages 110, and the outlet 212 of the nozzle 210 may be formed. The hydrogen introduced from the hydrogen supply manifold 120 may be guided along an end of the gasket 200, and may be discharged to the main flow passage 112' via the passages 110, or particularly, a portion of the first end passage 111-1.

Figure 2:
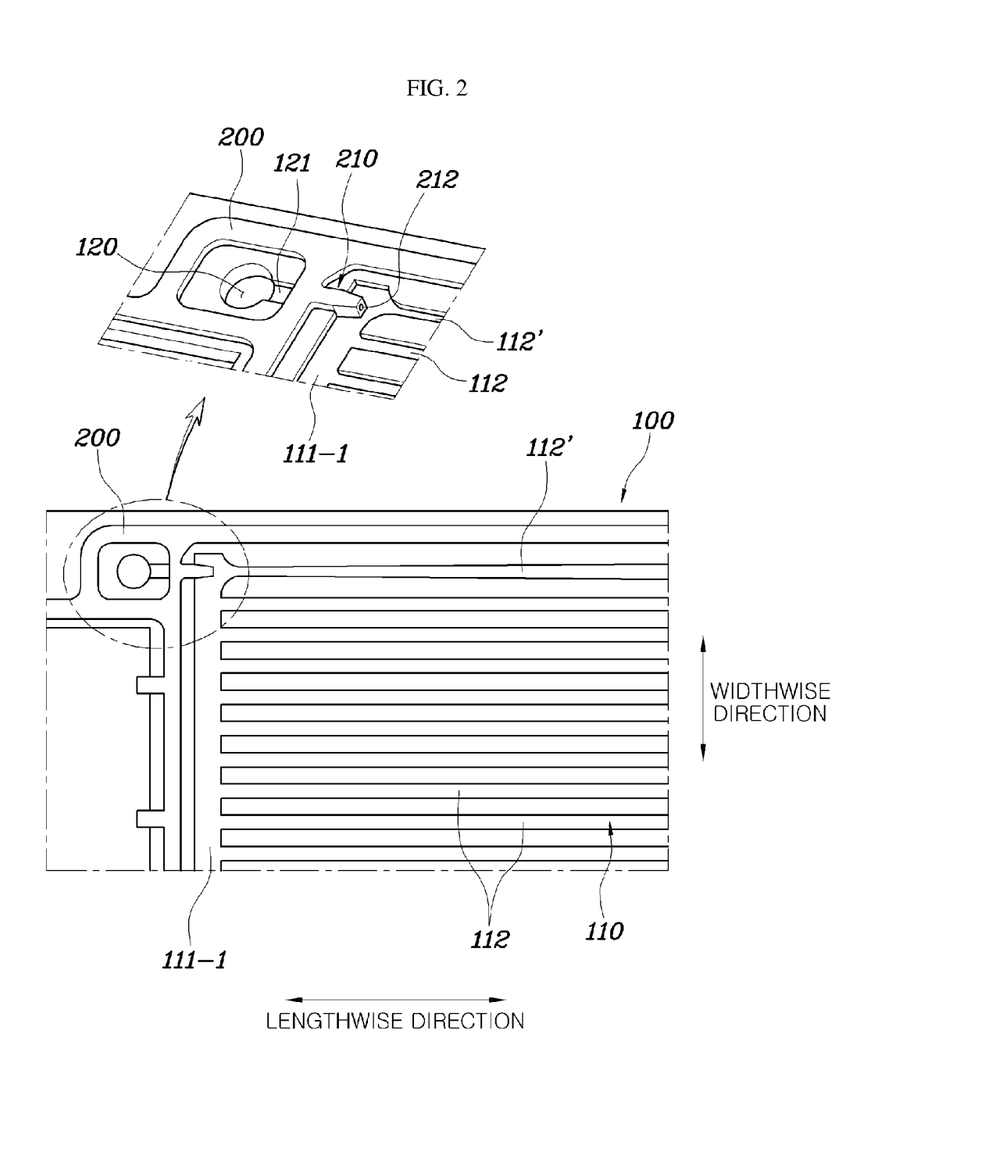
FIG. 2 shows an exemplary nozzle of an exemplary fuel cell according to an exemplary embodiment of the present invention.

In FIG. 2 a nozzle of an exemplary fuel cell according to an exemplary embodiment of the present invention is shown. As shown in FIG. 2, the shape of the nozzle 210 may vary without limitation. The nozzle 210 may be integrally from with the gasket 200, and the outlet 212 may protrude toward the passages 110. In particular, the nozzle 210 may be integrally injection-molded with the gasket 200, and the nozzle 210 may be formed by a aperture provided with the inlet 211 and the outlet 212, such that the hydrogen supply manifold 120 and the passages 110 may be communicated with each other. When the outlet 212 protrudes, the flow in a substantially straight direction of the discharged hydrogen may be improved, and the discharged hydrogen may not be scattered to various flow passages 112 but may be directly introduced into the main flow passage 112', such that the difference between the pressures of the first end passage 111-1 and the second end passage 111-2 may increase.

Figure 3:
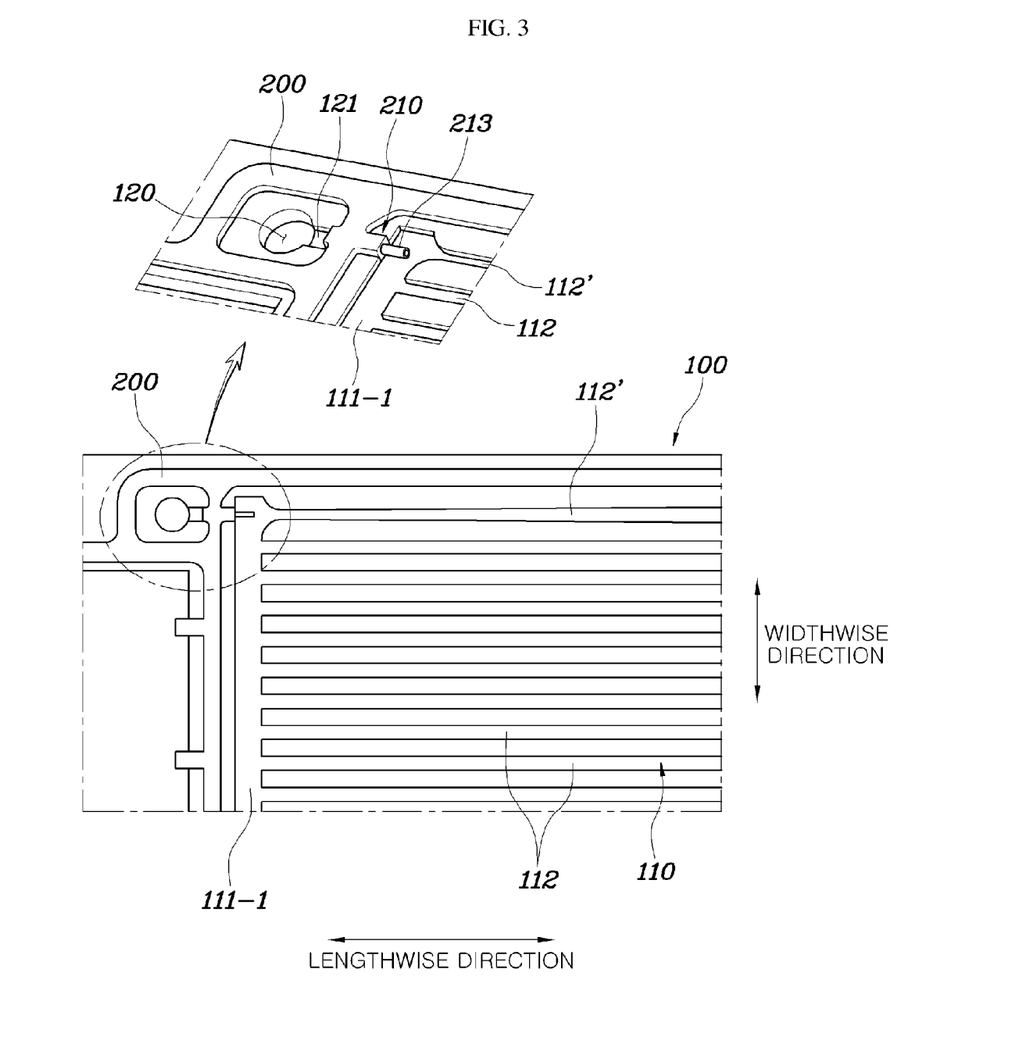
FIG. 3 shows an exemplary nozzle of an exemplary fuel cell according to an exemplary embodiment of the present invention.

In FIG. 3 a nozzle of an exemplary fuel cell according to an exemplary embodiment of the present invention is shown. As shown in FIG. 3, an exemplary micro tube 213 may be inserted into the gasket 200 to form the nozzle 210. The nozzle 210 may be formed by inserting the micro tube 213 into the gasket 200, such that the hydrogen supply manifold 120 and the passages 110 may communicate with each other. As such, manufacturing costs of the nozzle 210 may be reduced and the manufacturing process may be simplified. The nozzle 210 may be formed by forming an aperture in the gasket 200 and then inserting the micro tube 213 into the aperture. Alternatively, the nozzle 210 may be formed by integrally injection-molding or inserting injection-molded the micro tube 213. The micro tube 213 may be inserted without limiting the method thereof. The micro tube 213 may be an insulator.

In an exemplary embodiment, the separator 100 may further include a connection passage 121 which may connect the hydrogen supply manifold 120 and the passages 110. In particular, a portion of the nozzle 210 may be inserted into the connection passage 121. The connection passage 121 may support the nozzle 210 more stably and prevent separation of the gasket 200 from the separator 100 which may be caused by an elevated pressure of hydrogen flows.

Particularly, the nozzle 210 may include a portion of the gasket 200 forming or supporting the nozzle 210.

Figure 4:
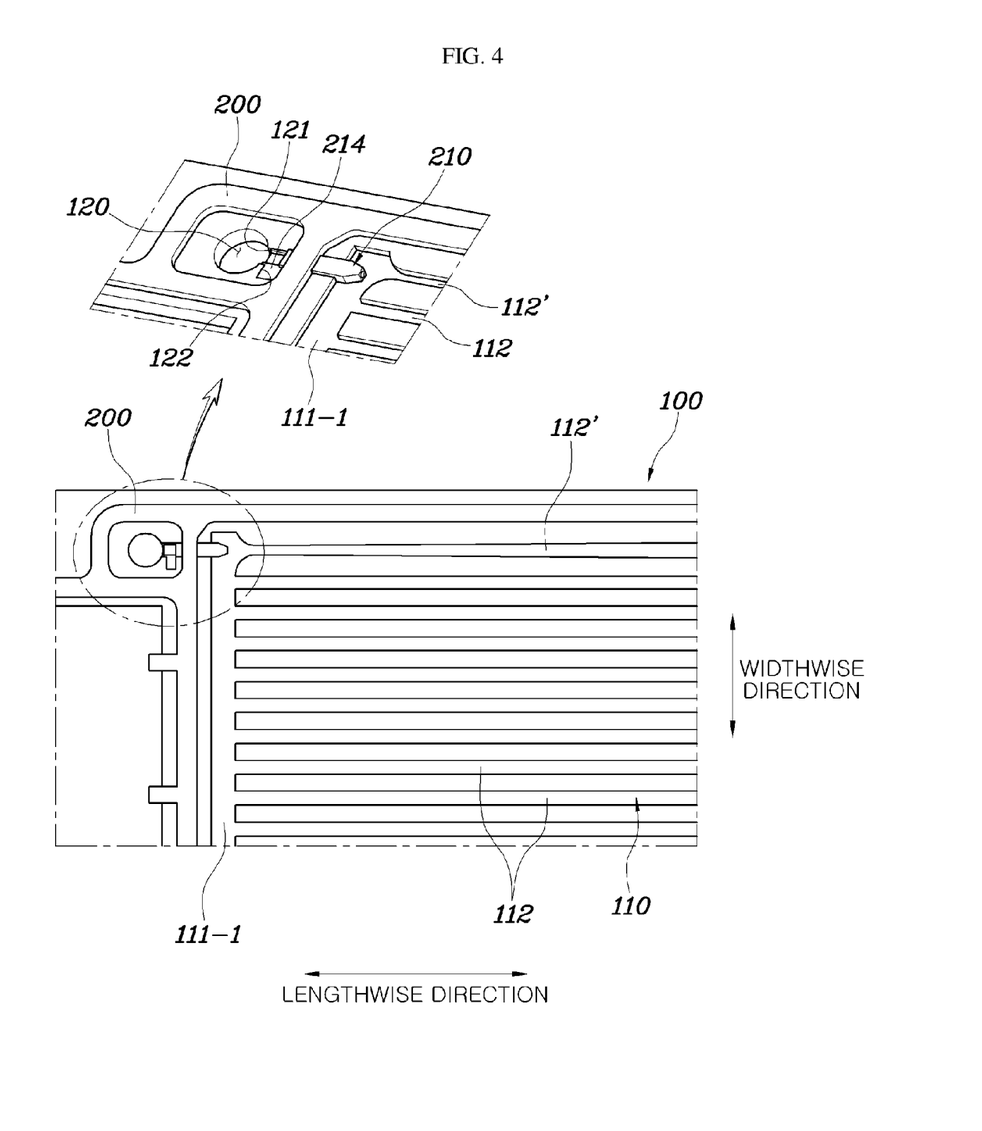
FIG. 4 shows an exemplary nozzle of an exemplary fuel cell according to an exemplary embodiment of the present invention.

In FIG. 4, a nozzle of an exemplary fuel cell according to an exemplary embodiment of the present invention is shown. As shown in FIG. 4, the nozzle 210 may be inserted into the connection passage 121. The gasket 200 and the nozzle 210 may be integrally formed with each other, and the nozzle 210 may be inserted into the connection passage 121. An insertion recess 122 may be formed at a side of the connection passage 121 and the nozzle 210 may have a coupling boss 214 which may be inserted into the insertion recess 122. As such, separation or shaking of the nozzle 210 caused by the flow of hydrogen of a high pressure may be prevented. In addition, the gasket 200 may cover a portion of the nozzle 210 such that the nozzle 210 may be supported by the separator 100 and the gasket 200. The nozzle 210 may be an insulator.

According to various exemplary embodiments of the present invention, the shapes of the nozzles 210 may vary but the remaining configurations of the nozzle may not vary.

Figure 5:
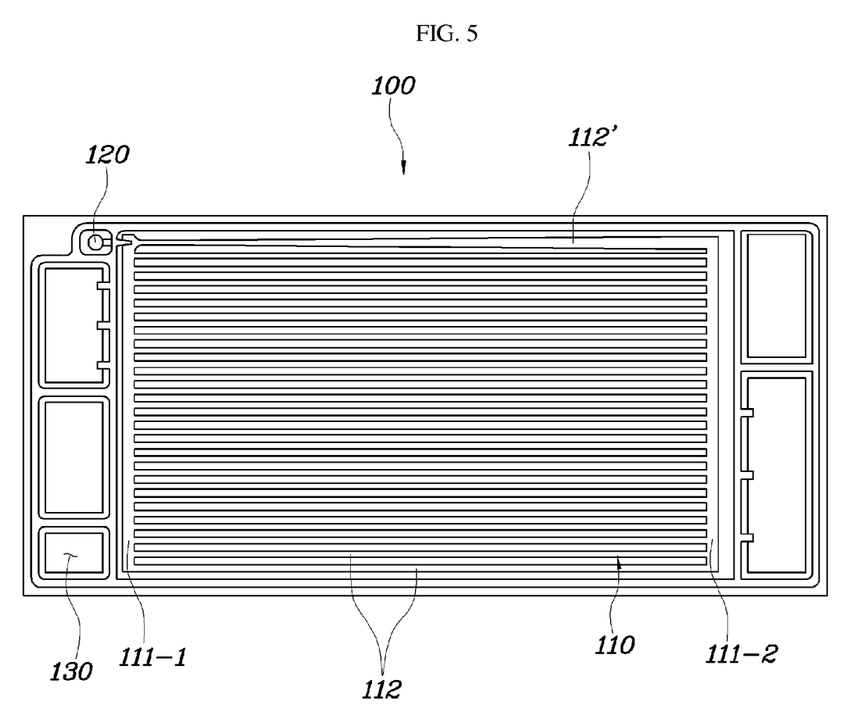
FIG. 5 shows an exemplary manifold disposition structure of exemplary fuel cells according to various exemplary embodiments of the present invention.

In FIG. 5, an exemplary manifold disposition structure of exemplary fuel cells according to various exemplary embodiments of the present invention is shown. In FIG. 5, the plurality of manifolds may include a drain manifold 130 configured to discharge the material existing in the hydrogen supply manifold 120 and the passages 110 to the exterior. In particular, the hydrogen supply manifold 120 and the drain manifold 130 may be disposed at the same end of the separator.

In the related art, the hydrogen supply manifold 120 and the drain manifold 130 are disposed at different ends of the separator. Hydrogen may be introduced from the hydrogen supply manifold formed at a first end of the separator 100 and some of materials such as condensate including hydrogen, nitrogen, and air may be discharged to the exterior through the drain manifold 130 formed at a second end of the separator 100.

Figure 6:
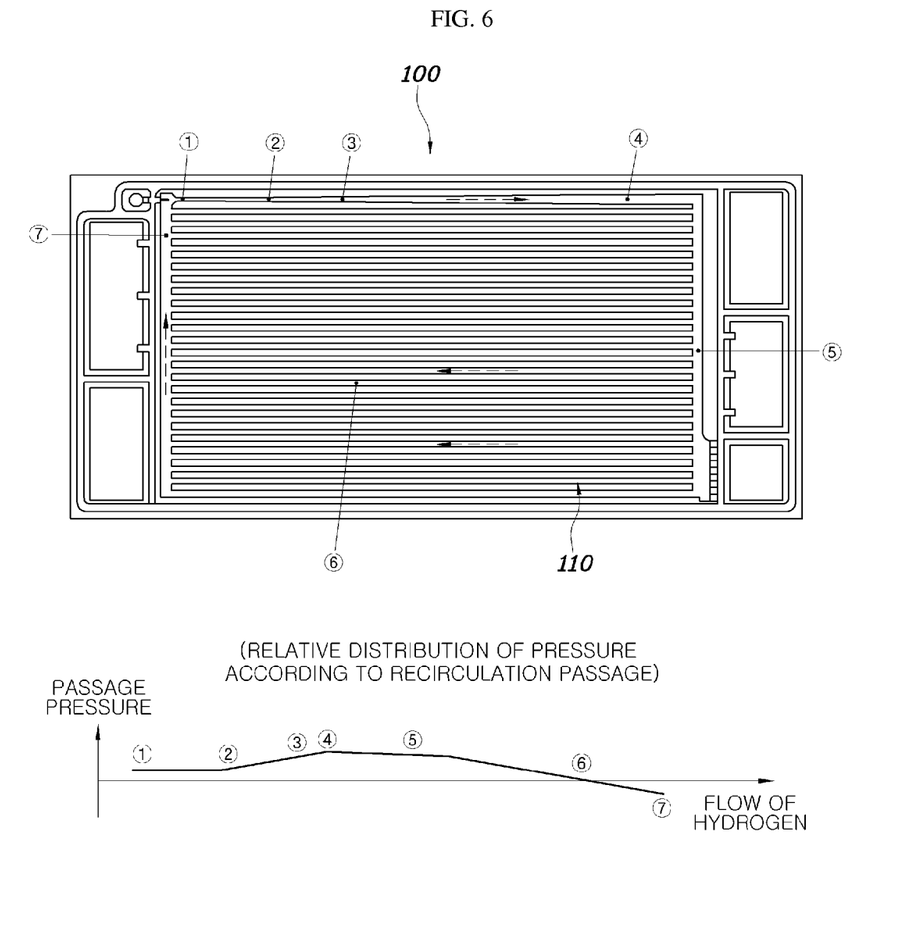
FIG. 6 shows an exemplary pressure change of passages according to various exemplary embodiments of the present invention.

In FIG. 6, pressure changes of the passages according to various exemplary embodiments of the present invention are shown. As shown in FIG. 6, according to the related art, when a pressure of the second end passage 111-2 is greater than a pressure of the first end passage 111-1, the pressure of the second end passage 111-2 may be reduced, such that a hydrogen recirculating effect may be reduced. In addition, the condensate and nitrogen generated in the passages 110 may not be discharged due to the reaction of hydrogen and air in the MEA.

Accordingly, the hydrogen supply manifold 120 and the drain manifold 130 may be disposed at the same end of the separator 100. For example, when the hydrogen supply manifold 120 and the drain manifold 130 are disposed at the first end of the separator 100, the pressure reduction at the opposite end passage 111-2 may be eliminated or alleviated and the material in the passages 110 may be more easily discharged when the material is discharged.

A pressure sensor (not shown) configured to measure a pressure of the discharged hydrogen may be disposed within the drain manifold 130. Since the pressure of the hydrogen supply manifold 120 may be elevated, the reduced pressure of the drain manifold 130 may be measured such that the pressure of the hydrogen flowing through the hydrogen supply manifold 120 or the passages 110 may be estimated. As such, the supplied pressure or the operation pressure may be detected accurately and thus, the supplied pressure may be controlled.

According to various exemplary fuel cells as described above, an additional exterior unit for recirculating hydrogen may be omitted and costs for the additional hydrogen circulating unit may be eliminated. Further, as the size of the manifold may be reduced, the area of the passages may increase and accordingly, the energy output density of the fuel cell may be improved.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A fuel cell, comprising:
a plurality of manifolds disposed at a first end and a second end of the fuel cell;
a separator having passages between the first end and the second end of the fuel cell;
a nozzle disposed between at least one of the plurality of manifolds and the passages and having an inlet into which a material is introduced from the at least one of the plurality of manifolds and an outlet from which the introduced material is discharged to the passages;
a pair of end passages formed in a widthwise direction of the separator at a first end and a second end of the passages; and
a plurality of flow passages formed in a lengthwise direction of the separator between the pair of end passages such that the pair of end passages communicate with each other and are disposed along a widthwise direction of the separator,
wherein the plurality of flow passages include a main flow passage and a plurality of sub-flow passages,
wherein the main flow passage is provided with the nozzle at a first side with a first end of the separator and located in correspondence to the outlet of the nozzle, the material discharged from the outlet is directly introduced throughout the main flow passage and the width of the main flow passage increases gradually from the first end of the passages to the second end of the passages,
wherein the material discharged flows to the second end passage after passing through the main flow passage and then flows to the first end passage through the sub-flow passages, so that the material introduced into the first end passage is merged into the material discharged from the outlet to flow to the second end passage, thereby recirculating the material, and
wherein the plurality of manifolds include:
a hydrogen supply manifold configured to supply hydrogen to the passages; and
a drain manifold configured to discharge the material existing in the passages to the exterior,
wherein the hydrogen supply manifold and the drain manifold are disposed at the same end of the separator.

2. The fuel cell of claim 1, wherein the nozzle is disposed between the passages and a hydrogen supply manifold configured to supply hydrogen to the passages.

3. The fuel cell of claim 1, wherein the nozzle is disposed at a first side of the passages, and one of the pair of end passages adjacent to the nozzle communicate with the outlet of the nozzle.

4. The fuel cell of claim 1, further comprising:
a gasket disposed along a circumference of at least one of the plurality of manifolds to be attached to the separator,
wherein an end of the gasket close to the passages is separated to define the outlet of the nozzle.

5. The fuel cell of claim 1, further comprising:
a gasket disposed along a circumference of at least one of the plurality of manifolds to be attached to the separator,
wherein the nozzle is integrally formed with the gasket and the outlet protrudes toward the passages.

6. The fuel cell of claim 5, wherein the separator further comprises:
a connection passage that connects at least one of the plurality of manifolds and the passages; and
a portion of the nozzle is inserted into the connection passage.

7. The fuel cell of claim 1, further comprising:
a gasket disposed along a circumference of at least one of the plurality of manifolds to be attached to the separator,
wherein the nozzle is formed by inserting a tube into the gasket.

8. The fuel cell of claim 1, wherein the separator further comprises:
a connection passage that connects at least one of the plurality of manifolds and the passages,
wherein the nozzle is inserted into the connection passage.

9. The fuel cell of claim 8, wherein an insertion recess is formed at a side of the connection passage, and the nozzle has a coupling boss inserted into the insertion recess.

10. The fuel cell of claim 8, further comprising:
a gasket disposed along a circumference of at least one of the plurality of manifolds to be attached to the separator,
wherein any nozzle formed integrally with the gasket has a portion covered by the gasket.

11. The fuel cell of claim 1,
wherein the drain manifold includes a pressure sensor configured to measure a pressure of the discharged hydrogen.

12. The fuel cell of claim 1, wherein a cross-section area of the outlet is less than a cross-section area of the inlet.

\* \* \* \* \*